United States Patent
Yamazaki et al.

(10) Patent No.: US 10,352,196 B2
(45) Date of Patent: Jul. 16, 2019

(54) GAS TURBINE OPERATION METHOD AND OPERATION CONTROL DEVICE

(71) Applicant: MITSUBISHI HITACHI POWER SYSTEMS, LTD., Kanagawa (JP)

(72) Inventors: Shinichi Yamazaki, Tokyo (JP); Hirotaka Nakasako, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 423 days.

(21) Appl. No.: 15/112,292

(22) PCT Filed: Jan. 21, 2015

(86) PCT No.: PCT/JP2015/051576
§ 371 (c)(1),
(2) Date: Jul. 18, 2016

(87) PCT Pub. No.: WO2015/111636
PCT Pub. Date: Jul. 30, 2015

(65) Prior Publication Data
US 2016/0333743 A1  Nov. 17, 2016

(30) Foreign Application Priority Data
Jan. 27, 2014  (JP) .................................. 2014-012718

(51) Int. Cl.
*F01D 25/32* (2006.01)
*F02C 7/12* (2006.01)
(Continued)

(52) U.S. Cl.
CPC ................ *F01D 25/32* (2013.01); *F02C 6/08* (2013.01); *F02C 7/125* (2013.01); *F02C 7/18* (2013.01);
(Continued)

(58) Field of Classification Search
CPC .......... F01D 25/32; F28F 17/005; F02C 6/08; F02C 7/125; F02C 7/18; F02C 7/185;
(Continued)

(56) References Cited

U.S. PATENT DOCUMENTS 6,644,035 B1 * 11/2003 Yamanaka .............. F01D 25/10
60/806
6,978,623 B2 * 12/2005 Hyakutake .............. F01D 21/12
415/114

(Continued)

FOREIGN PATENT DOCUMENTS

JP  62-40300  3/1987
JP  8-82226  3/1996
(Continued)

OTHER PUBLICATIONS

Written Opinion of the International Searching Authority dated Apr. 21, 2015 in International (PCT) Application No. PCT/JP2015/051576, with English translation.
(Continued)

*Primary Examiner* — Aaron R Eastman
(74) *Attorney, Agent, or Firm* — Wenderoth, Lind & Ponack, L.L.P.

(57) ABSTRACT

To remove water accumulated in a cooling air system while preventing performance loss of a gas turbine, the gas turbine is provided with a cooling air system that connects an intermediate stage or the exit of a compressor to a turbine to supply compressed air bled from the compressor to the turbine, a TCA cooler, i.e., a heat exchanger, that cools the compressed air on the route of the cooling air system, and a drain water discharge valve, i.e., a first drain water discharge valve and a second drain water discharge valve disposed downstream of the compressed air of the TCA cooler, wherein at least for a predetermined period of time after a rated speed of the gas turbine at start up has been reached,
(Continued)

the drain water discharge valve is set to an open state, and thereafter, the drain water discharge valve is set to a closed state.

8 Claims, 5 Drawing Sheets

(51) Int. Cl.
    *F02C 7/18*        (2006.01)
    *F28F 17/00*      (2006.01)
    *F02C 6/08*       (2006.01)

(52) U.S. Cl.
    CPC ............ *F02C 7/185* (2013.01); *F28F 17/005* (2013.01); *F05D 2220/32* (2013.01); *F05D 2260/20* (2013.01); *F05D 2260/602* (2013.01); *F05D 2260/95* (2013.01); *F05D 2270/304* (2013.01)

(58) Field of Classification Search
    CPC ............ F05D 2220/32; F05D 2260/20; F05D 2260/602; F05D 2260/95; F05D 2270/304
    USPC ....................................................... 415/169.2
    See application file for complete search history.

(56) References Cited

U.S. PATENT DOCUMENTS

| | | | |
|---|---|---|---|
| 8,075,245 B2 * | 12/2011 | Odle | ................... B01D 53/265 415/1 |
| 2004/0172947 A1 * | 9/2004 | Takahama | ................. F02C 6/18 60/772 |
| 2012/0195740 A1 * | 8/2012 | Karishuku | .............. F02C 3/305 415/169.2 |

FOREIGN PATENT DOCUMENTS

| | | |
|---|---|---|
| JP | 2000-161084 | 6/2000 |
| JP | 2007-146787 | 6/2007 |
| JP | 2012-154290 | 8/2012 |

OTHER PUBLICATIONS

International Search Report dated Apr. 21, 2015 in International (PCT) Application No. PCT/JP2015/051576.

* cited by examiner

GAS TURBINE OPERATION METHOD AND OPERATION CONTROL DEVICE

TECHNICAL FIELD

The present invention relates to a gas turbine operation method and an operation control device.

BACKGROUND ART

A gas turbine is made up of a compressor, a combustor, and a turbine. The compressor produces high temperature and high pressure compressed air by compressing the air taken in at the air inlet. The combustor generates high temperature and high pressure combustion gas by supplying fuel to the compressed air, and combusting the fuel. The turbine includes a plurality of turbine vanes and turbine blades disposed alternately in a passage within a casing, and by driving the turbine blades with the combustion gas supplied to the passage, the turbine shaft that is connected to a generator is driven in rotation. The combustion gas that has driven the turbine is released to the atmosphere as exhaust gas.

Conventionally, for example, in the gas turbine described in Japanese Unexamined Patent Application Publication No. 2007-146787, a cooling air (cooling air supply means) is disclosed that extracts compressed air that has been compressed by the compressor, cools it with a heat exchanger (TCA cooler), and supplies it to the turbine blades on the turbine side, thereby cooling the turbine blades.

For example, the gas turbine system described in Japanese Unexamined Patent Application Publication No. 2012-154290 discloses connecting a drain collection pipe between stages and at the outlet of the compressor that compresses air sprayed with a liquid, so that the liquid drain is discharged outside the system.

With the cooling air system disclosed in Japanese Unexamined Patent Application Publication No. 2007-146787, water accumulates at the outlet side of the heat exchanger, so there is a possibility of occurrence of corrosion. Also, it is not desirable that this corrosion be carried to the turbine side by the flow of cooling air. The drain collection pipe disclosed in Japanese Unexamined Patent Application Publication No. 2012-154290 is applied to the gas turbine system that includes the compressor that compresses air sprayed with a liquid. However, if this drain collection pipe is constantly used during operation of the gas turbine, compressed air bled from the compressor will also escape, so there is a possibility that this will lead to performance loss of the gas turbine.

The present invention solves the above problem, and it is an object of the present invention to provide gas turbine operation method and operation control device capable of removing water accumulated in a cooling air system while preventing performance loss of the gas turbine.

SUMMARY OF THE INVENTION

In order to achieve the above object, a gas turbine operation method according to the present invention is for a gas turbine that includes a cooling air system that connects an intermediate stage or an exit of a compressor to a turbine to supply compressed air bled from the compressor to the turbine, a heat exchanger that cools the compressed air provided on the route of the cooling air system, and a drain water discharge valve provided on the downstream side of the compressed air of the heat exchanger. The method includes: setting the drain water discharge valve to an open state for at least a predetermined period of time after a rated speed of the gas turbine has been reached at start up; and subsequently setting the drain water discharge valve to a closed state.

Before start up of the gas turbine, the temperature of the heat exchanger itself provided in the cooling air system and the temperature of the coolant are low. When the gas turbine starts up, the compressed air bled from the compressor is supplied to the heat exchanger via the cooling air system, but at this time the temperatures of the heat exchanger itself and the coolant are low, so the temperature of the compressed air is greatly reduced, and a large quantity of drain water is generated. Then, when the temperatures of the heat exchanger itself and the coolant increase, the quantity of drain water generated is reduced. The inventors discovered that a large quantity of drain water is generated immediately after the rated speed is reached in the start up sequence of the gas turbine. Therefore, according to this gas turbine operation method, the drain water discharge valve can be placed in the open state, only for the period of time when a large quantity of drain water is generated and accumulated, to discharge the water of the cooling air system. Therefore it is possible to prevent corrosion of the cooling air system, and when the predetermined period of time has been exceeded the drain water discharge valve is closed, so escape of the compressed air fed to the cooling air system can be minimized, and performance loss of the gas turbine can be prevented.

Also, in the gas turbine operation method according to the present invention, the predetermined period of time is terminated when, after the rated speed of the gas turbine at start up has been reached, an outlet temperature of the heat exchanger increases to a setting temperature.

The setting temperature can be the temperature at the point of time when the generation of drain water due to condensation stops. Therefore, by closing the drain water discharge valve based on the temperature of the outlet of the heat exchanger, escape of the compressed air delivered to the cooling air system is minimized, and the effect of prevention of performance loss of the gas turbine can be significantly obtained.

Also, in the gas turbine operation method according to the present invention, the predetermined period of time is terminated when a setting time has passed after start up of the gas turbine.

The setting time can be the elapsed time from start up of the gas turbine until generation of the drain water due to condensation stops. Therefore, by closing the drain water discharge valve based on the setting time from start up of the gas turbine, escape of the compressed air delivered to the cooling air system is minimized, and the effect of prevention of performance loss of the gas turbine can be significantly obtained.

Also, in the gas turbine operation method according to the present invention, the drain water discharge valve is held in a closed state when the gas turbine is stopped, and the drain water discharge valve is placed in an open state after the gas turbine has started up.

For example, when a pipe on which the drain water discharge valve is provided is connected to a drain pit in which drain water discharged from other equipment is also accumulated, there is a possibility of occurrence of corrosion of the cooling air system due to moisture from other equipment being delivered and drawn into the cooling air system through the pipe when the gas turbine is stopped. Therefore, by closing the drain water discharge valve when the gas turbine is stopped, and opening the drain water discharge valve after the gas turbine starts up, it is possible to prevent moisture from being drawn into the cooling air system when the gas turbine is stopped.

In order to achieve the above object, a gas turbine operation control device according to the present invention is for a gas turbine that includes a cooling air system that connects an intermediate stage or an exit of a compressor to a turbine to supply compressed air bled from the compressor to the turbine, a heat exchanger that cools the compressed air provided on the route of the cooling air system, and a drain water discharge valve provided on the downstream side of the compressed air of the heat exchanger. The operation control device detects a predetermined period of time after a rated speed of the gas turbine at start up has been reached, controls the drain water discharge valve to be in an open state for at least the predetermined period of time, and controls the drain water discharge valve to be in a closed state when the predetermined period of time has been exceeded.

Before start up of the gas turbine, the temperature of the heat exchanger itself provided in the cooling air system and the temperature of the coolant are low. When the gas turbine starts up, the compressed air bled from the compressor is supplied to the heat exchanger via the cooling air system, but at this time the temperatures of the heat exchanger itself and the coolant are low, so the temperature of the compressed air is greatly reduced, and a large quantity of drain water is generated. Then, when the temperatures of the heat exchanger itself and the coolant increase, the quantity of drain water generated is reduced. The inventors discovered that a large quantity of drain water is generated immediately after the rated speed is reached in the start up sequence of the gas turbine. Therefore, according to this gas turbine operation control device, the drain water discharge valve is controlled to be in the open state, only for the period of time when a large quantity of drain water is generated and accumulated, so that the water of the cooling air system can be discharged. Therefore it is possible to prevent corrosion of the cooling air system, and when the predetermined period of time has been exceeded the drain water discharge valve is controlled to be closed, so escape of the compressed air fed to the cooling air system can be minimized, and performance loss of the gas turbine can be prevented.

Also, in the gas turbine operation control device according to the present invention, an outlet temperature of the heat exchanger is detected, and the drain water discharge valve is controlled to be closed when the outlet temperature has increased and reached a setting temperature.

The setting temperature can be the temperature at the point of time when the generation of drain water due to condensation stops. Therefore, by controlling the closure of the drain water discharge valve based on the temperature of the outlet of the heat exchanger, escape of the compressed air delivered to the cooling air system is minimized, and the effect of prevention of performance loss of the gas turbine can be significantly obtained.

Also, in the gas turbine operation control device according to the present invention, an elapsed time from start up of the gas turbine is detected, and the drain water discharge valve is controlled to be closed when the elapsed time reaches a preset setting time.

The setting time can be the elapsed time from start up of the gas turbine until generation of the drain water due to condensation stops. Therefore, by controlling the closure of the drain water discharge valve based on the setting time from start up of the gas turbine, escape of the compressed air delivered to the cooling air system is minimized, and the effect of prevention of performance loss of the gas turbine can be significantly obtained.

Also, in the gas turbine operation control device according to the present invention, stopping and starting of the gas turbine is detected, the drain water discharge valve is controlled to be in the closed state when the gas turbine is stopped, and the drain water discharge valve is controlled to be in the open state after the gas turbine has started up.

For example, when a pipe on which the drain water discharge valve is provided is connected to a drain pit in which drain water discharged from other equipment is also accumulated, there is a possibility of occurrence of corrosion of the cooling air system due to moisture from other equipment being delivered and drawn into the cooling air system through the pipe when the gas turbine is stopped. Therefore, by controlling the drain water discharge valve to be closed when the gas turbine is stopped, and controlling the drain water discharge valve to be opened after the gas turbine starts up, it is possible to prevent moisture from being drawn into the cooling air system when the gas turbine is stopped.

Advantageous Effects of Invention

According to the present invention, water accumulated in the cooling air system can be removed while performance loss of the gas turbine is prevented.

DETAILED DESCRIPTION OF EMBODIMENTS

Detailed descriptions will be given below of embodiments according to the present invention on the basis of the drawings. Note that the present invention is not limited by these embodiments. In addition, the constituent elements in the embodiments described below include those that can be easily replaced by a person skilled in the art or those that are substantially the same.

Figure 1:
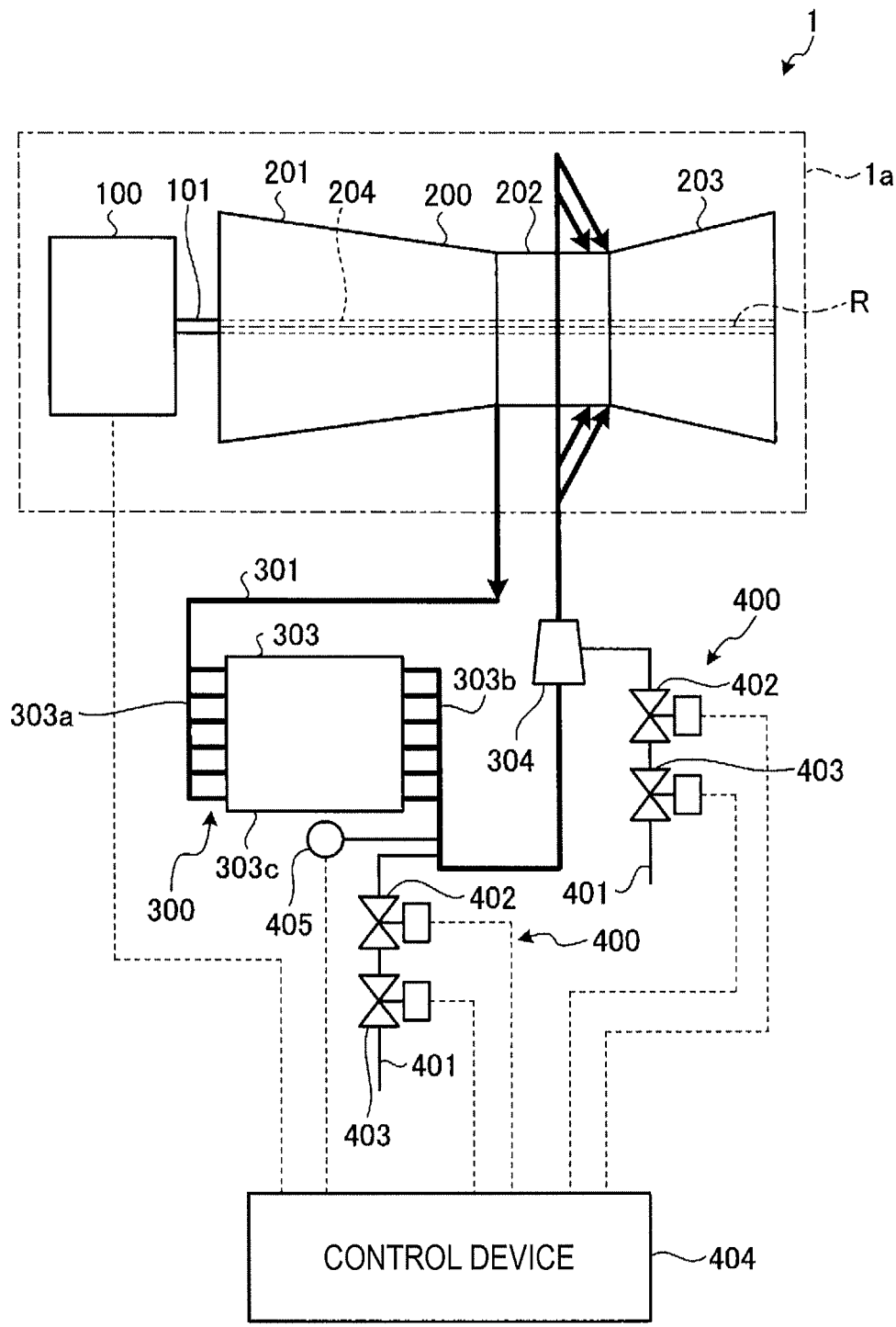
FIG. 1 is a schematic configuration diagram of a gas turbine operation control device according to an embodiment of the present invention.
Figure 2:
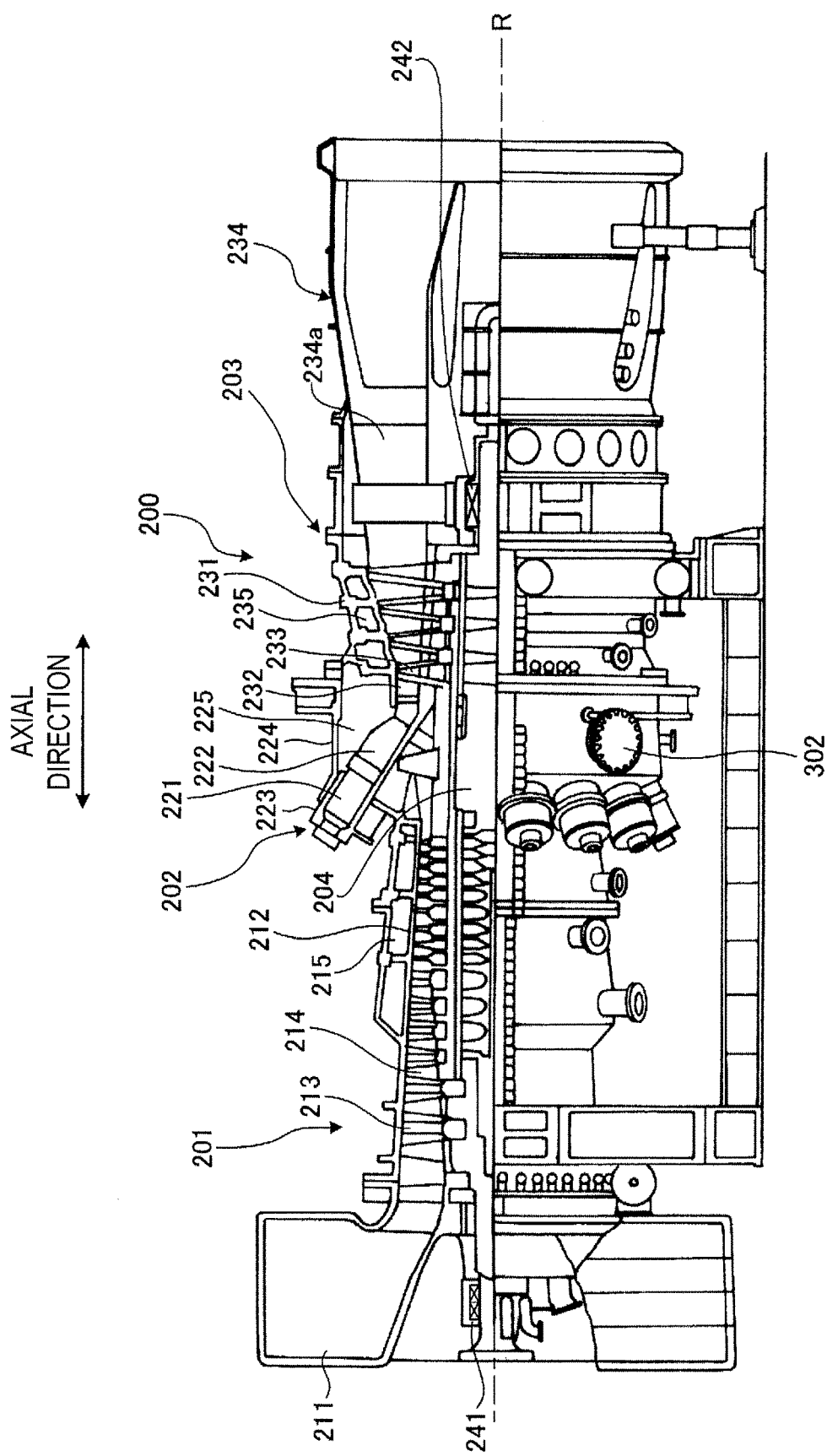
FIG. 2 is a configuration diagram of a gas turbine to which the gas turbine operation control device according to the embodiment of the present invention has been applied.
Figure 3:
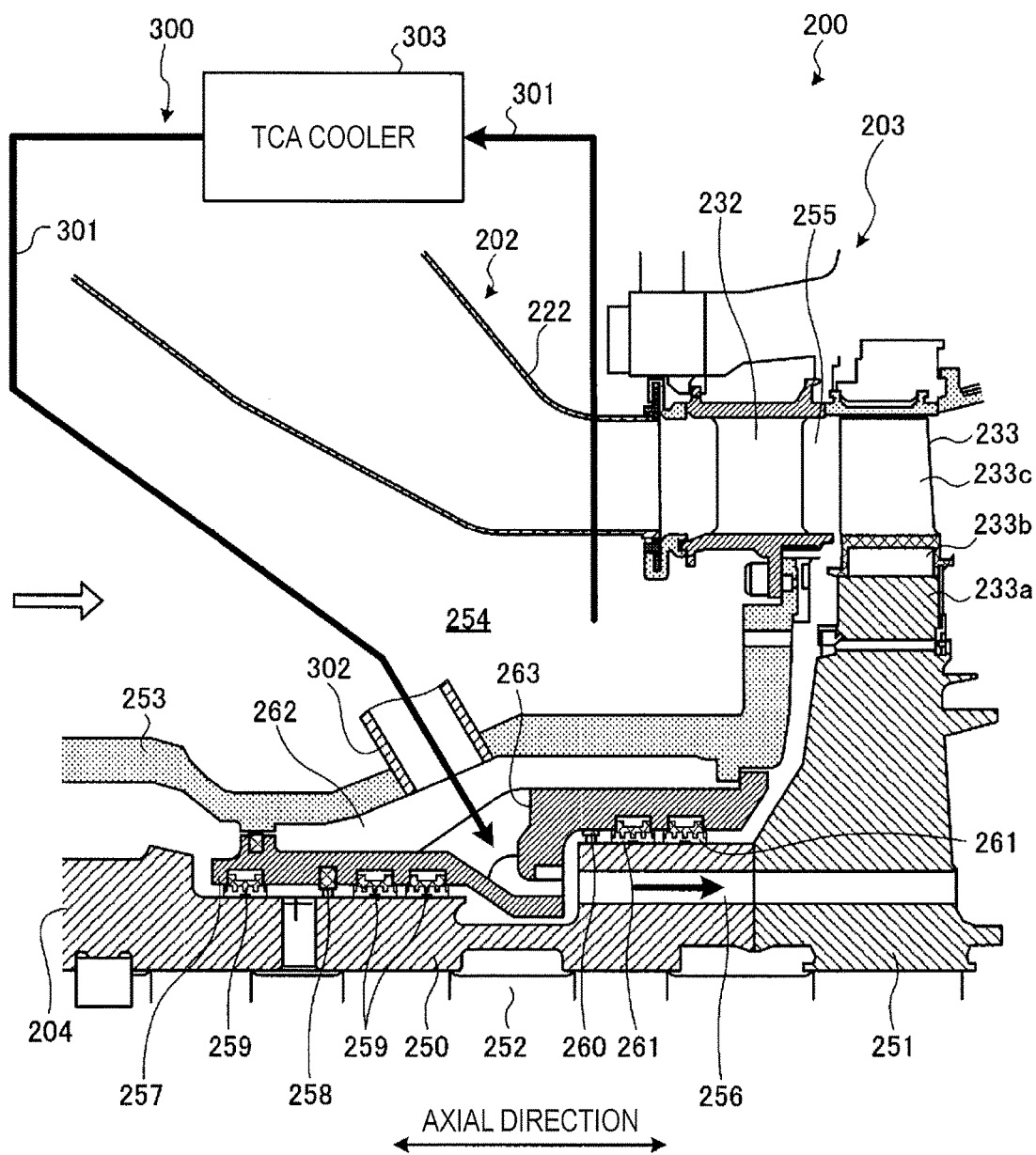
FIG. 3 is a configuration diagram of a cooling air system in a gas turbine to which the gas turbine operation control device according to the embodiment of the present invention has been applied.
Figure 4:
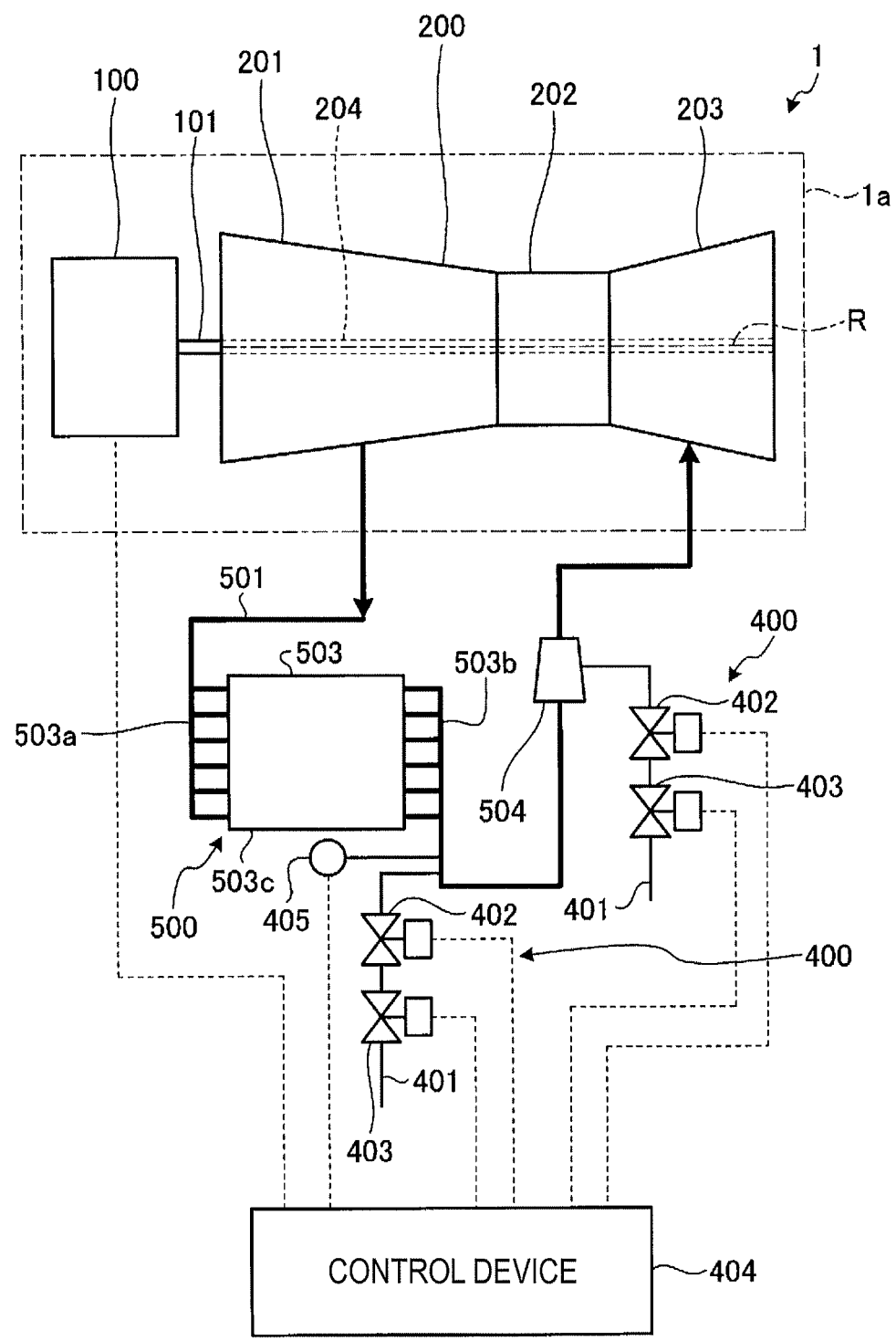
FIG. 4 is a schematic configuration diagram of another example of a cooling air system in a gas turbine to which the gas turbine operation control device according to the embodiment of the present invention has been applied.
Figure 5:
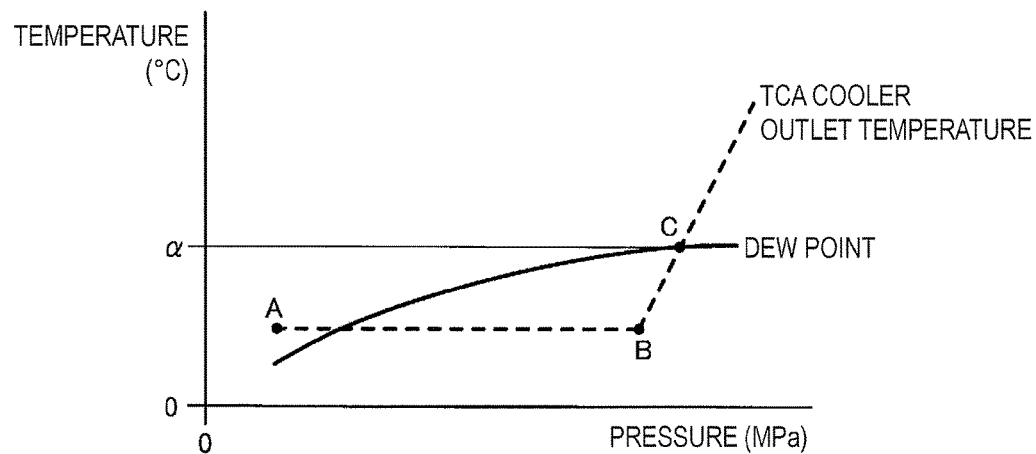
FIG. 5 is a graph showing the relationship between the air pressure and the dew point.
Figure 6:
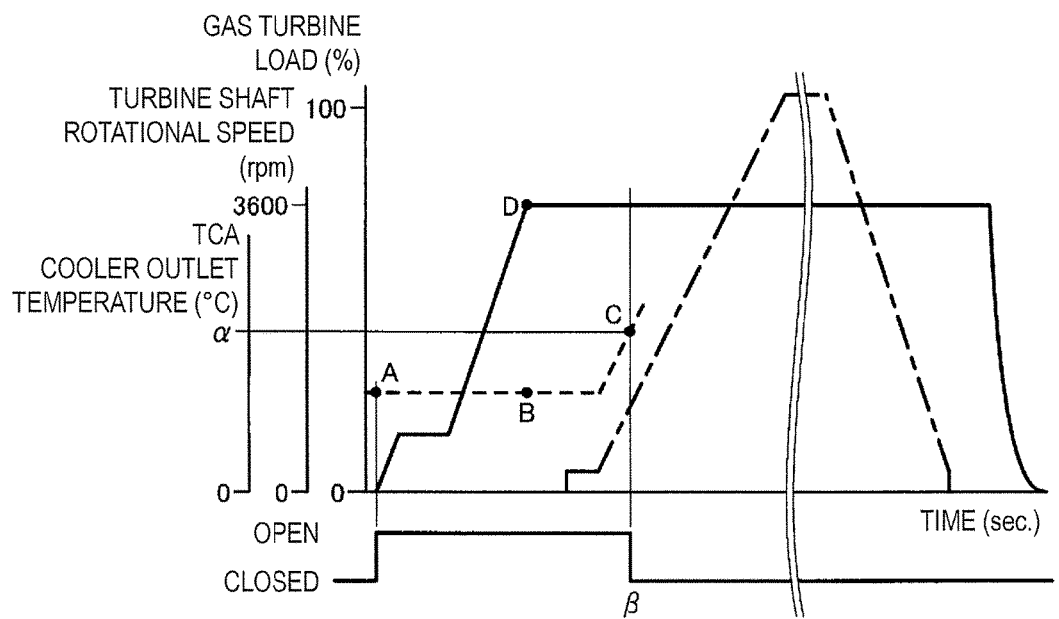
FIG. 6 is a graph showing the gas turbine load, the turbine shaft rotational speed, and the heat exchanger outlet temperature in the gas turbine versus time.

FIG. 1 is a schematic configuration diagram of a gas turbine power generation plant according to the present embodiment, FIG. 2 is a configuration diagram of a gas turbine in the gas turbine power generation plant according to the present embodiment, and FIG. 3 is a configuration diagram of a cooling air system in the gas turbine power generation plant according to the present embodiment. Also, FIG. 4 is a schematic configuration diagram of another example of a gas turbine power generation plant according to the present embodiment. Also, FIG. 5 is a graph showing the relationship between the air pressure and the dew point, and FIG. 6 is a graph showing the gas turbine load, the turbine shaft rotational speed, and the heat exchanger outlet temperature in the gas turbine versus time.

As illustrated in FIG. 1, a gas turbine power generation plant 1 includes a generator 100, a gas turbine 200, a cooling air system 300, and a drain water discharge system 400.

A drive shaft 101 of the generator 100 is connected to a turbine shaft 204 of the gas turbine 200 that is described later, and power is generated by applying the rotational power of the turbine shaft 204 to the drive shaft 101. Note that the generator 100 is also used as a start-up motor that applies rotational power to the turbine shaft 204 when the gas turbine 200 is started up.

The gas turbine 200 has a compressor 201, a combustor 202, and a turbine 203. The turbine shaft 204 of the gas turbine 200 passes through the centers of the compressor 201, the combustor 202, and the turbine 203. The compressor 201, the combustor 202, and the turbine 203 are juxtaposed in that order along an axis R of the turbine shaft 204 from the front side towards the rear side in the flow of the air. Note that in the following description, the turbine axial direction refers to a direction parallel to the axis R, and the turbine circumferential direction refers to a circumferential direction about the axis R as the center.

The compressor 201 generates compressed air by compressing air. As illustrated in FIG. 2, the compressor 201 includes compressor vanes 213 and compressor blades 214 provided within a compressor casing 212 having an air inlet 211 for intaking air. The plurality of compressor vanes 213 is installed in proximity in a row in the turbine circumferential direction on the compressor casing 212 side. Also, the plurality of compressor blades 214 is installed in proximity in a row in the turbine circumferential direction on the turbine shaft 204 side. The compressor vanes 213 and the compressor blades 214 are provided alternately along the turbine axial direction.

As illustrated in FIG. 2, the combustor 202 generates high temperature and high pressure combustion gas by supplying fuel to the compressed air that has been compressed by the compressor 201. The combustor 202 includes, as combustion liners, a combustor basket 221 in which the compressed air and the fuel are mixed and combusted, a transition piece 222 that guides the combustion gas from the combustor basket 221 to the turbine 203, and an external cylinder 223 that covers the outer periphery of the combustor basket 221 and forms an air passage 225 that guides the compressed air from the compressor 201 to the combustor basket 221. A plurality of combustors 202 (for example, 16 combustors 202) is juxtaposed in the turbine circumferential direction on a combustor casing 224 that forms a turbine compartment.

As illustrated in FIG. 2, the turbine 203 generates rotational power from the combustion gas that is combusted in the combustor 202. The turbine 203 includes turbine vanes 232 and turbine blades 233 provided within a turbine casing 231. The plurality of turbine vanes 232 is installed in proximity in a row in the turbine circumferential direction on the turbine casing 231 side. Also, the plurality of turbine blades 233 is installed in proximity in a row in the turbine circumferential direction on the turbine shaft 204 side. The turbine vanes 232 and the turbine blades 233 are provided alternately along the turbine axial direction. Also, an exhaust chamber 234 that has an exhaust diffuser 234a connected to the turbine 203 is provided on the rear side of the turbine casing 231.

The turbine shaft 204 is supported at the end on the compressor 201 side by a bearing 241, and is supported at the end on the exhaust chamber 234 side by a bearing 242, and is provided so that it can freely rotate about the axis R as the center. Also, the turbine shaft 204 is connected to the drive shaft 101 of the generator 100 at the end thereof on the compressor 201 side.

In the gas turbine 200, air taken in through the air inlet 211 of the compressor 201 passes through the plurality of compressor vanes 213 and compressor blades 214 and is compressed, thereby converting the air to high temperature and high pressure compressed air. By mixing fuel and the compressed air in the combustor 202 and combusting it, high temperature and high pressure combustion gas is generated. Then, by passing the combustion gas through the turbine vanes 232 and the turbine blades 233 of the turbine 203, the turbine shaft 204 is driven in rotation, and the rotational power is applied to the generator 100, which is connected to the turbine shaft 204, to generate power. Then, after driving the turbine shaft 204 in rotation, the exhaust gas passes through the exhaust diffuser 234a of the exhaust chamber 234 and is released to the atmosphere as exhaust gas.

The cooling air system 300 is provided in the gas turbine 200, and supplies compressed air bled from the compressor 201 to the turbine 203.

The following is a description of the cooling air system 300. As illustrated in FIG. 3, in the gas turbine 200 as described above, the turbine shaft 204 includes a plurality of turbine disks 251 that are integrally connected to an intermediate shaft 250 with connecting bolts 252, and is rotatably supported by the bearings 241, 242. The turbine blades 233 are installed on the outer periphery of the turbine disks 251. The turbine blades 233 include a plurality of blade roots 233a fixed to the outer peripheral end of the turbine disk 251 along the turbine circumferential direction, a platform 233b connecting blade roots 233a to one another, and a plurality of blade parts 233c fixed to the outer peripheral surface of the platform 233b at equal intervals in the circumferential direction.

Also, an intermediate shaft cover 253 formed in a ring shape along the turbine circumferential direction is fitted around the outer periphery of the turbine shaft 204, and on the outer periphery of the intermediate shaft cover 253, a turbine compartment 254 is demarcated within the combustor casing 224 and on the outside of the plurality of combustors 202. On the other hand, the transition piece 222 of the combustor 202 communicates with a combustion gas passage 255 formed in a ring shape along the turbine circumferential direction in the turbine 203. The plurality of turbine vanes 232 and the plurality of turbine blades 233 (blade parts 233c) are disposed alternately along the turbine axial direction in the combustion gas passage 255.

A cooling air supply hole 256 that opens as an inlet on the compressor 201 side is provided along the turbine axial direction in the turbine disks 251 of the turbine shaft 204. The cooling air supply hole 256 is formed along the turbine axial direction, and is in communication with a cooling hole (not illustrated on the drawings) provided within each turbine blade 233 via each turbine disk 251. Also, within the intermediate shaft cover 253, in the vicinity of the inlet to the cooling air supply hole 256, a seal ring retaining ring 257 is provided in a ring shape along the turbine circumferential direction. At each end in the turbine axial direction, the seal ring retaining ring 257 is fitted in close contact at the outer peripheral surface thereof with the inner periphery of the intermediate shaft cover 253, thereby defining a space 262 with the intermediate shaft cover 253, in the center in the turbine axial direction and along the turbine circumferential direction. Also, a plurality of seals 258, 259, 260, 261 that seal the gap between the inner peripheral surface of the seal ring retaining ring 257 and the outer peripheral surface of the turbine shaft 204 is provided on the inner peripheral surface of the seal ring retaining ring 257. Also, the space 262 defined between the intermediate shaft cover 253 and the seal ring retaining ring 257 is in communication with the inlet to the cooling air supply hole 256 via a through hole 263 formed in the seal ring retaining ring 257.

A first end side of a cooling air pipe 301 of the cooling air system 300 is connected to the combustor casing 224 so that it is in communication with the outside of the turbine compartment 254. Specifically, as illustrated in FIG. 1, the first end side is made up of one end of the cooling air pipe 301, and it is connected to one connector 302 formed in the combustor casing 224 as illustrated in FIG. 3. Also, as illustrated in FIG. 1, a plurality of branches (four in FIG. 1) is formed in a second end side of the cooling air pipe 301, each penetrating the combustor casing 224 and installed on the intermediate shaft cover 253, and in communication with the cooling air supply hole 256 via the space 262. Also, a TCA cooler 303, which is a heat exchanger, is provided on the route of the cooling air pipe 301. The TCA cooler 303 includes an inlet header 303a connected to the first end side of the cooling air pipe 301 and an outlet header 303b connected to the second end side of the cooling air pipe 301, both provided on a heat exchanger unit 303c. The compressed air supplied from the inlet header 303a exchanges heat with a coolant in the heat exchanger unit 303c, and after exchanging heat the compressed air is discharged from the outlet header 303b. As illustrated in FIG. 1, normally the TCA cooler 303 is disposed outside a building 1a of the gas turbine power generation plant 1, which contains the gas turbine 200 and the like, so the cooling air pipe 301 is led outside the building 1a and connected to the TCA cooler 303, and is again returned into the building 1a from the TCA cooler 303. In addition, as illustrated in FIG. 1, the cooling air pipe 301 is provided with a filter 304 on the route thereof at a location closer to the second end side than the location of the TCA cooler 303.

When the gas turbine 200 is operating, the compressed air that has been compressed by the compressor 201 of the gas turbine 200 is supplied to the turbine compartment 254. The compressed air is guided from the turbine compartment 254 to the combustor 202, and high temperature and high pressure combustion gas is generated in the combustor 202, which passes through the transition piece 222 and flows through the combustion gas passage 255 and is fed to the turbine 203. In the cooling air system 300, a portion of the compressed air supplied to the turbine compartment 254, which is in communication with the outlet of the compressor 201, is bled from the first end side of the cooling air pipe 301, and is supplied from the second end side of the cooling air pipe 301 through the space 262 and through the through hole 263 to the cooling air supply hole 256 on the turbine 203 side, and passes through a cooling hole in each turbine blade 233. The compressed air that passes through the cooling air pipe 301 is cooled by the TCA cooler 303, has foreign matter removed by the filter 304, and is delivered to each turbine blade 233, where it cools each turbine blade 233.

In the cooling air system 300 as described above, compressed air from the outlet of the compressor 201 is bled and supplied to the turbine 203 side, but the present invention can also be applied to other cooling air systems. FIG. 4 is a schematic configuration diagram of another example of a gas turbine power generation plant according to the present embodiment, illustrating another example of a cooling air system. As illustrated in FIG. 4, a cooling air system 500 bleeds compressed air from an intermediate stage of the compressor 201 and supplies it to the turbine 203 side.

In the gas turbine 200 as described above, as illustrated in FIG. 2, the compressor 201 is provided with a compressor air extraction chamber 215, on the outside of the position of the compressor vanes 213 on the compressor casing 212, which is in communication with the inside of the compressor casing 212 and is formed in a ring shape along the turbine circumferential direction. Also, the turbine 203 is provided with a turbine vane ring cavity 235 formed in a ring shape along the turbine circumferential direction, on the outside of the position of the turbine vanes 232 in the combustor casing 224. The turbine vane ring cavity 235 is in communication with cooling holes (not illustrated on the drawings) provided on the inside of each turbine vane 232.

As illustrated in FIG. 4, a first end side of a cooling air pipe 501 of the cooling air system 500 is connected to the compressor air extraction chamber 215. Also, a second end side of the cooling air pipe 501 is connected to the turbine vane ring cavity 235. Also, a TCA cooler 503, which is a heat exchanger, is provided on the route of the cooling air pipe 501. The TCA cooler 503 includes an inlet header 503a connected to the first end side of the cooling air pipe 501 and an outlet header 503b connected to the second end side of the cooling air pipe 501, both provided on a heat exchanger unit 503c. The target of cooling supplied from the inlet header 503a exchanges heat in the heat exchanger unit 503c, and after exchanging heat the target of cooling is discharged from the outlet header 503b. As illustrated in FIG. 4, in order to increase the heat exchange efficiency, the TCA cooler 503 is disposed outside the building 1a of the gas turbine power generation plant 1 that contains the gas turbine 200 and the like, so the cooling air pipe 501 is led outside the building 1a and connected to the TCA cooler 503. In addition, as illustrated in FIG. 4, the cooling air pipe 501 is provided with a filter 504 on the route thereof, on the second end side of the TCA cooler 503. This filter 504 is also disposed outside the building 1a of the gas turbine power generation plant 1.

Therefore, the cooling air system 500 extracts compressed air compressed by the compressor 201 of the gas turbine 200 through the first end of the cooling air pipe 501 from the compressor air extraction chamber 215, and passes the compressed air from the second end side of the cooling air pipe 501 through the turbine vane ring cavity 235 to the cooling holes in each turbine vane 232. The compressed air that passes through the cooling air pipe 501 is cooled by the TCA cooler 503, has foreign matter brought in from the compressor air extraction chamber 215 removed by the filter 504, and is delivered to each turbine vane 232, where it cools each turbine vane 232.

The drain water discharge system 400 discharges drain water from the cooling air system 300, 500. The drain water is generated by condensation of the moisture in the air condensing when the temperature of the high temperature and high pressure compressed air is reduced by the TCA cooler 303, and it can easily accumulate in the outlet header 303b of the TCA cooler 303. Also, a portion of the drain water that has accumulated in the outlet header 303b of the TCA cooler 303 is delivered through the cooling air pipe 301, 501 with the flow of the compressed air, and can easily accumulate in a low position within the cooling air system such as the casing of the filter 304. Therefore, as illustrated in FIG. 1 or FIG. 4, a drain water discharge pipe 401 of the drain water discharge system 400 is connected to the cooling air pipe 301, 501 in the cooling air system 300, 500. In particular, in the present embodiment, the drain water discharge pipe 401 is connected to the outlet header 303b of the TCA cooler 303. Also, when the filter 304, 504 is provided in the cooling air system 300, 500, the drain water discharge pipe 401 is connected to the casing of the filter 304, 504. A drain water discharge valve is provided on the drain water discharge pipe 401. One drain water discharge valve may be provided, but for safety a first drain water discharge valve 402 and a second drain water discharge valve 403 may be provided in combination along the drain water discharge pipe 401. Note that the drain water discharge pipe 401 is connected to a drain pit (not illustrated on the drawings) where the drain water is accumulated. The drain pit can be exclusively connected to the drain water discharge pipe 401, or drain water from other equipment can also be accumulated therein.

Also, the drain water discharge system 400 includes a control device 404, which is an operation control device of the gas turbine 200 and which controls the opening and closing of the drain water discharge valve (first drain water discharge valve 402 and second drain water discharge valve 403) when the gas turbine 200 is operated. The control device 404 acquires the temperature of the compressed air at the outlet header 303b, 503b of the TCA cooler 303, 503 (TCA cooler 303, 503 outlet temperature) from a temperature measuring instrument 405 provided on the outlet header 303b, 503b of the TCA cooler 303, 503. Also, the control device 404 acquires the start up of the gas turbine 200 from a control device (not illustrated on the drawings) on the gas turbine 200 side. Also, the control device 404 acquires the elapsed time from start up of the gas turbine 200 from the control device (not illustrated on the drawings) on the gas turbine 200 side.

Also, a setting temperature α of the outlet temperature of the TCA cooler 303, 503 shown in FIGS. 5 and 6, and a setting time β that is the elapsed time from start up of the gas turbine 200 shown in FIG. 6 are set in advance in order that the control device 404 controls the closure of the first drain water discharge valve 402 and the second drain water discharge valve 403.

The following is a description of the setting temperature α. The curved solid line shown in FIG. 5 shows the change in the dew point when air with a prescribed humidity is compressed. From here it can be seen that the dew point is raised by compressing the air. Also, the broken line connecting point A, point B, and point C in FIG. 5 shows the outlet condition of the TCA cooler 303, 503 in the start up sequence of the gas turbine 200. Point A is the time of start up of the gas turbine, and point B is the time at which the rated rotational speed is reached. In the time period from point A to point B, although the pressure of the compressed air increases as the rotational speed of the compressor 201 increases, the temperature of the TCA cooler 303, 503 itself and the temperature of the coolant supplied to the TCA cooler 303, 503 are low, so the outlet temperature of the TCA cooler 303, 503 does not rise much. Therefore, the outlet temperature of the TCA cooler 303, 503 is below the dew point temperature, so condensation occurs and drain water is generated. Thereafter, as the gas turbine 200 is paralleled in and the load thereon is increased, the pressure of the compressed air increases, and the temperature of the TCA cooler 303, 503 itself and the temperature of the coolant supplied to the TCA cooler 303, 503 increase, so the outlet temperature of the TCA cooler 303, 503 increases. Then, from point C onwards after the outlet temperature of the TCA cooler 303, 503 exceeds the dew point temperature, condensation does not occur. In other words, when the outlet conditions of the TCA cooler 303, 503 are in the region below the solid line shown in FIG. 5, condensation occurs at the outlet of the TCA cooler 303, 503, and drain water accumulates. In particular, around the time at which the rated rotational speed is reached (point B), the outlet temperature of the TCA cooler 303, 503 is greatly less than the dew point at that pressure, so a large quantity of drain water is generated. Note that the dew point temperature fluctuates in accordance with the atmospheric temperature, so in the control device 404 the setting temperature α (i.e., the dew point of the compressed air) is set in accordance with the atmospheric temperature.

The following is a description of the setting time β. In FIG. 6, the horizontal axis is time, the solid line indicates the rotational speed of the turbine shaft 204, the broken line indicates the temperature of the outlet header 303b, 503b of the TCA cooler 303, 503 (outlet temperature), and the dot-and-dash line indicates the load of the gas turbine 200. The rotational speed of the turbine shaft 204 increases when rotational power is applied by the start-up motor when the gas turbine 200 starts up (point A) from the stopped state (stationary or turning state of the turbine). After purge operation at a certain speed is over, the speed is again increased by the start-up motor, and when the combustor 202 ignites and the turbine 203 is capable of independent operation, the start-up motor is disconnected. At point D, the rated speed under no load (for example, 3600 rpm) is reached. Then, after point D the generator 100 is paralleled in, and the load of the gas turbine 200 is increased while the rated rotational speed of the turbine shaft 204 is maintained. In the process of increasing the load of the gas turbine 200, the temperature of the outlet header 303b, 503b of the TCA cooler 303, 503 (outlet temperature) reaches the setting temperature α. When starting up the gas turbine 200, the elapsed time from point A at start up until the temperature of the outlet header 303b, 503b of the TCA cooler 303, 503 increases and reaches the setting temperature α is the setting time β. Note that when the gas turbine 200 is stopped, the generator 100 is taken off-line with the rotational speed of the turbine shaft 204 maintained at the rated speed, and the load is reduced, and then the supply of fuel to the combustor 202 is stopped.

Then, the control device 404 discharges the drain water by controlling the opening and closing of the drain water discharge valve (first drain water discharge valve 402 and second drain water discharge valve 403) as necessary. Specifically, as shown in FIG. 6, the control device 404 controls the first drain water discharge valve 402 and the second drain water discharge valve 403 to be open at the time of start up (point A) of the gas turbine 200 from the stopped state. Then, after the gas turbine 200 has reached its rated speed at start up (point D), when the temperature of the outlet header 303b, 503b of the TCA cooler 303, 503 has increased and reached the setting temperature α, the control device 404 controls the first drain water discharge valve 402 and the second drain water discharge valve 403 to be closed. The control device 404 maintains this closure control until the next time the gas turbine 200 is started up (point A) from the stopped state.

Note that in the control by the control device 404 based on the setting temperature α as described above, when the temperature of the outlet header 303b, 503b of the TCA cooler 303, 503 (outlet temperature) has reached the setting temperature α, the first drain water discharge valve 402 and the second drain water discharge valve 403 are controlled to be closed. However, in order to properly discharge the drain water that has been generated before the setting temperature α is reached, the first drain water discharge valve 402 and the second drain water discharge valve 403 may be controlled to be closed when a setting temperature α+x has been reached, in which a small margin temperature x is added to the setting temperature α.

Also, as illustrated in FIG. 6, the control device 404 may control the first drain water discharge valve 402 and the second drain water discharge valve 403 to be opened at the time of start up (point A) of the gas turbine 200 from the stopped state, and when the setting time β has passed since start up of the gas turbine 200 after the rated speed at start up of the gas turbine 200 is reached (point D), the control device 404 may control the first drain water discharge valve 402 and the second drain water discharge valve 403 to be closed. The control device 404 maintains this closure control until the next time the gas turbine 200 is started up (point A) from the stopped state.

Note that in the control by the control device 404 based on the setting time β as described above, when the setting time β has passed since start up of the gas turbine 200, the first drain water discharge valve 402 and the second drain water discharge valve 403 are controlled to be closed. However, in order to properly discharge the drain water that has been generated before the setting time β passes, the first drain water discharge valve 402 and the second drain water discharge valve 403 may be controlled to be closed when a setting time β+y has passed, in which a small margin of time y is added to the setting time β.

As described above, the control device 404 controls the first drain water discharge valve 402 and the second drain water discharge valve 403 to be open from start up (point A) of the gas turbine 200 until the setting temperature α or the setting time β is reached, but this is not a limitation. The drain water is generated most after the rated speed is reached at start up of the gas turbine 200, and generation of drain water stops after the load starts to rise at start up of the gas turbine 200. Therefore, the control device 404 controls the first drain water discharge valve 402 and the second drain water discharge valve 403 to be open at least for a predetermined period of time after the rated speed of the gas turbine 200 at start up has been reached. The point of time at which that predetermined period of time is terminated may be a point of time at which occurrence of condensation has stopped and all the accumulated drain water can be discharged. For example, the start of the predetermined period of time may be the time of start up of the gas turbine 200 (point A) or the time when the rated speed of the gas turbine 200 at start up is reached (point D), and the end of the predetermined period of time may be the point of time when the setting temperature α (α+x) is reached or the point of time when the setting time β (β+y) has passed. Also, the start of the predetermined period of time may be the point of time when the setting temperature α has been reached or the setting time β has passed, or it may be a point of time after the setting temperature α has been reached or a point of time after the setting time β has passed, and the end of the predetermined period of time may be after the period of time required to discharge all the drain water, obtained in advance, for example, from a test, has passed.

In other words, in the present embodiment, the gas turbine operation method for the gas turbine 200, which includes the cooling air system 300, 500 that connects an intermediate stage or the exit of the compressor 201 to the turbine 203 to supply compressed air bled from the compressor 201 to the turbine 203, the TCA cooler (heat exchanger) 303, 503 that cools the compressed air provided on the route of the cooling air system 300, 500, and the drain water discharge valve (first drain water discharge valve 402 and second drain water discharge valve 403) provided on the downstream side of the compressed air of the TCA cooler 303, 503, includes putting the drain water discharge valve in the open state for at least a predetermined period of time after the rated speed of the gas turbine 200 at start up has been reached, and subsequently putting the drain water discharge valve in the closed state when the predetermined period of time has been exceeded.

Before start up of the gas turbine 200, the temperature of the TCA cooler 303, 503 itself provided in the cooling air system 300, 500 and the temperature of the coolant are low. When the gas turbine 200 starts up, the compressed air bled from the compressor 201 is supplied to the TCA cooler 303, 503 via the cooling air system 300, 500, but at this time the temperatures of the TCA cooler 303, 503 itself and the coolant are low, so the temperature of the compressed air is greatly reduced, and a large quantity of drain water is generated. Then, when the temperatures of the TCA cooler 303, 503 itself and the coolant increase, the quantity of drain water generated is reduced. The inventors discovered that a large quantity of drain water is generated immediately after the rated speed is reached in the start up sequence of the gas turbine 200. Therefore, according to this gas turbine 200 operation method, the first drain water discharge valve 402 and the second drain water discharge valve 403 can be in the open state to discharge the drain water of the cooling air system 300, 500 only for the period of time when a large quantity of drain water is generated and accumulated. Therefore it is possible to prevent corrosion of the cooling air system 300, 500, and when the predetermined period of time has been exceeded the first drain water discharge valve 402 and the second drain water discharge valve 403 are closed, so escape of the compressed air fed to the cooling air system 300, 500 can be minimized, and performance loss of the gas turbine 200 can be prevented.

Also, in the gas turbine 200 operation method of the present embodiment, the predetermined period of time is terminated at the point of time when, after the rated speed of the gas turbine 200 at start up has been reached, the temperature of the outlet header 303b, 503b of the TCA cooler 303, 503 increases and reaches the setting temperature α.

The setting temperature α can be the temperature at the point of time when the generation of drain water due to condensation stops. Therefore, by closing the first drain water discharge valve 402 and the second drain water discharge valve 403 based on the temperature of the outlet header 303b, 503b of the TCA cooler 303, 503, escape of the compressed air delivered to the cooling air system 300, 500 is minimized, and the effect of prevention of performance loss of the gas turbine 200 can be significantly obtained.

Also, in the gas turbine 200 operation method of the present embodiment, the predetermined period of time is terminated at the point of time when the setting time β has passed after start up of the gas turbine 200.

The setting time β can be the elapsed time from start up of the gas turbine 200 until generation of the drain water due to condensation stops. Therefore, by closing the first drain water discharge valve 402 and the second drain water discharge valve 403 based on the setting time β from start up of the gas turbine 200, escape of the compressed air delivered to the cooling air system 300, 500 is minimized, and the effect of prevention of performance loss of the gas turbine 200 can be significantly obtained.

Also, in the gas turbine 200 operation method of the present embodiment, the first drain water discharge valve 402 and the second drain water discharge valve 403 are held in the closed state when the gas turbine 200 is stopped, and the first drain water discharge valve 402 and the second drain water discharge valve 403 are placed in the open state after the gas turbine 200 has started up.

For example, when the drain water discharge pipe 401 on which the first drain water discharge valve 402 and the second drain water discharge valve 403 are provided is connected to a drain pit in which drain water discharged from other equipment is also accumulated, there is a possibility of occurrence of corrosion of the cooling air system 300, 500 due to moisture from other equipment being delivered and drawn into the cooling air system 300, 500 through the drain water discharge pipe 401 when the gas turbine 200 is stopped. Therefore, by closing the first drain water discharge valve 402 and the second drain water discharge valve 403 when the gas turbine 200 is stopped, and opening the first drain water discharge valve 402 and the second drain water discharge valve 403 after the gas turbine 200 starts up, it is possible to prevent moisture from being drawn into the cooling air system 300, 500 when the gas turbine 200 is stopped.

REFERENCE SIGNS LIST

200 Gas turbine
201 Compressor
203 Turbine
300, 500 Cooling air system
303, 503 TCA cooler (heat exchanger)
303b, 503b Outlet header
400 Drain water discharge system
401 Drain water discharge pipe
402 First drain water discharge valve
403 Second drain water discharge valve
404 Control device
α Setting temperature
β Setting time

The invention claimed is:

1. A gas turbine operation method of operating a gas turbine that includes a cooling air system that connects an intermediate stage or an exit of a compressor to a turbine to supply compressed air bled from the compressor to the turbine, a heat exchanger that cools the compressed air flowing through the cooling air system, and a drain water discharge valve provided on a compressed air downstream side of the heat exchanger, the method comprising:
setting the drain water discharge valve to an open state for at least a predetermined period of time after a rated speed of the gas turbine has been reached at start up; and
subsequently setting the drain water discharge valve to a closed state,
wherein a compressed air outlet temperature of the heat exchanger exceeds a dew point temperature of the compressed air as a load on the gas turbine is increased.

2. The gas turbine operation method according to claim 1, wherein the predetermined period of time is terminated when, after the rated speed of the gas turbine at start up has been reached, the compressed air outlet temperature of the heat exchanger increases to the dew point temperature of the compressed air.

3. The gas turbine operation method according to claim 2, wherein the operation control device is further configured to hold the drain water discharge valve in a closed state when the gas turbine is stopped, and place the drain water discharge valve in an open state after the gas turbine has started up.

4. The gas turbine operation method according to claim 1, wherein the drain water discharge valve is held in a closed state when the gas turbine is stopped, and the drain water discharge valve is placed in an open state after the gas turbine has started up.

5. A gas turbine operation control device for a gas turbine that includes a cooling air system that connects an intermediate stage or an exit of a compressor to a turbine to supply compressed air bled from the compressor to the turbine, a heat exchanger that cools the compressed air flowing through the cooling air system, and a drain water discharge valve provided on a compressed air downstream side of the heat exchanger, wherein the operation control device is configured to:
detect a predetermined period of time after a rated speed of the gas turbine at start up has been reached,
control the drain water discharge valve to be in an open state for at least the predetermined period of time, and
control the drain water discharge valve to be in a closed state when the predetermined period of time has been exceeded,
wherein a compressed air outlet temperature of the heat exchanger exceeds a dew point temperature of the compressed air as a load on the gas turbine is increased.

6. The gas turbine operation control device according to claim 5, wherein the operation control device is further configured to detect the compressed air outlet temperature of the heat exchanger, and to control the drain water discharge valve to be closed when the outlet temperature has increased and reached the dew point temperature of the compressed air.

7. The gas turbine operation control device according to claim 6, wherein the operation control device is further configured to detect stopping and starting of the gas turbine, control the drain water discharge valve to be in the closed state when the gas turbine is stopped, and control the drain water discharge valve to be in the open state after the gas turbine has started up.

8. The gas turbine operation control device according to claim 5, wherein the operation control device is further configured to detect stopping and starting of the gas turbine, control the drain water discharge valve to be in the closed state when the gas turbine is stopped, and control the drain water discharge valve to be in the open state after the gas turbine has started up.

* * * * *